(12) United States Patent
Vermeersch et al.

(10) Patent No.: US 9,280,166 B2
(45) Date of Patent: Mar. 8, 2016

(54) ELECTRONIC MANAGEMENT SYSTEM FOR PHOTOVOLTAIC CELLS

(75) Inventors: Marc Vermeersch, Le Vésinet (FR);
Bruno Estibals, Saint Thomas (FR);
Corinne Alonso, Ramonville Saint Agne (FR)

(73) Assignee: TOTAL MARKETING SERVICES, Puteaux (FR)

( * ) Notice: Subject to any disclaimer, the term of this patent is extended or adjusted under 35 U.S.C. 154(b) by 1026 days.

(21) Appl. No.: 13/140,628

(22) PCT Filed: Dec. 18, 2009

(86) PCT No.: PCT/IB2009/055852
§ 371 (c)(1),
(2), (4) Date: Dec. 7, 2011

(87) PCT Pub. No.: WO2010/070621
PCT Pub. Date: Jun. 24, 2010

(65) Prior Publication Data
US 2012/0068547 A1 Mar. 22, 2012

(30) Foreign Application Priority Data

Dec. 18, 2008 (FR) .................................. 08 07119

(51) Int. Cl.
*H02J 1/00* (2006.01)
*G05F 1/67* (2006.01)

(52) U.S. Cl.
CPC . *G05F 1/67* (2013.01); *Y02E 10/58* (2013.01); *Y10T 307/707* (2015.04)

(58) Field of Classification Search
USPC ......................................................... 307/82
See application file for complete search history.

(56) References Cited

U.S. PATENT DOCUMENTS

| 4,742,243 | A | 5/1988 | Zabar et al. |
| 2005/0094423 | A1 | 5/2005 | Lai et al. |
| 2008/0143188 | A1 | 6/2008 | Adest et al. |
| 2011/0094503 | A1* | 4/2011 | Jones et al. ................... 126/714 |

FOREIGN PATENT DOCUMENTS

| CA | 2260039 | 1/1998 |
| CN | 1877979 A | 12/2006 |
| CN | 101227090 A | 5/2011 |
| DE | 19627816 A1 | 1/1998 |
| JP | H01-99443 | 4/1989 |
| JP | H05-122867 | 5/1993 |

(Continued)

OTHER PUBLICATIONS

International Search Report, PCT/IB2009/055852, Mar. 5, 2010, 3 pages.

(Continued)

*Primary Examiner* — Rexford Barnie
*Assistant Examiner* — Dru Parries
(74) *Attorney, Agent, or Firm* — Polsinelli PC (57) ABSTRACT

An electronic management system for a photovoltaic generator is disclosed herein. The, the electronic management system comprises a plurality of static microconverters, each microconverter being electrically connected to one or more photovoltaic cells, the one or more photovoltaic cells forming a portion of a whole of the cells of the generator, a reconfiguration module adapted for transmitting energy flows from said microconverters towards a load, and a central electronic unit adapted for controlling a modification of the energy flows transmitted by said at least one reconfiguration module.

14 Claims, 3 Drawing Sheets

(56) References Cited

FOREIGN PATENT DOCUMENTS

| | | |
|---|---|---|
| JP | H10-69321 | 3/1998 |
| JP | H10-248180 | 9/1998 |
| JP | 2000-174308 | 6/2000 |
| JP | 2002-50782 | 9/2003 |
| JP | 2003-339118 | 11/2003 |
| JP | 2005-107033 | 4/2005 |
| JP | 2005-115441 | 10/2006 |
| JP | 2004-364493 | 10/2007 |
| RU | 2003930 C1 | 11/1993 |
| RU | 2265915 C1 | 12/2005 |
| WO | WO 2008/062076 A1 | 5/2008 |
| WO | WO2008/125915 | 10/2008 |
| WO | WO 2008/125915 A2 | 10/2008 |

OTHER PUBLICATIONS

Kjaer S. B. et al. "A Review of Single-Phase Grid-Connected Inverters for Photovoltaic Modules." IEEE Transactions on Industry Applications, vol. 41, No. 5, Sep./Oct. 2005, pp. 1292-1306.

Vesasco G. et al. "Grid-Connected PV Systems Energy Extraction Improvement by means of an Electric Array Reconfiguration (EAR) Strategy: Operating Principle and Experimental Results." Power Electronics Specialists Conference, 2008. PESC 2008. IEEE, Piscataway, NJ, USA, Jun. 15, 2008, pp. 1983-1988.

Office Action, Japanese Patent Application No. JP2011-541711, 12 pages (includes translation).

Office Action, Chinese Patent Application No. CN200980150926.6; 9 pages (includes translation).

Final Office Action, Japanese Patent Application No. JP2011-541711, dated Feb. 25, 2015; 12 pages (includes translation).

Supplement to Office Action, Chinese Patent Application No. CN200980150926.6; 9 pages (includes translation).

PhotoVoltaic DC-DC Module Integrated Converted for Novel Cascaded and Bypass Grid Connection Topologies—Design and Optimisation, by Geoffrey R. Walk and Jordan C. Pierce, 7 pages.

Office Action, Russian Patent Application No. RU2011129409, 9 pages (includes translation).

* cited by examiner

ELECTRONIC MANAGEMENT SYSTEM FOR PHOTOVOLTAIC CELLS

CROSS-REFERENCE TO RELATED APPLICATIONS

This application is a national stage filing based upon international application no. PCT/IB2009/055852, filed 18 Dec. 2009 and published on 24 Jun. 2010 under international publication no. WO 2010/070621 (the '852 application), which claims priority to French application no. 08 07 119, filed 18 Dec. 2008 (the '119 application). The '852 application and '119 application are both hereby incorporated by reference as though fully set forth herein.

SUMMARY

The present invention relates to the field of photovoltaic generators and more specifically to photovoltaic modules integrating electronics; such a module comprises a photovoltaic generator and an electronic management system for photovoltaic cells.

DETAILED DESCRIPTIONS

In a way known per se, a photovoltaic generator (PVG) comprises one or more photovoltaic cells (PV) connected in series and/or in parallel. In the case of inorganic materials, a photovoltaic cell essentially consists of a diode (pin or pn junction) made up from a semiconductor material. This material has the property of absorbing light energy, a significant portion of which may be transferred to charge carriers (electrons and holes). With the structure of a diode (pin or pn junction)—with doping of two areas of type N and of type P respectively—optionally separated by a non-doped region (called an "intrinsic" region and designated by "i" in the pin junction)—it is possible to separate the charge carriers in order to then collect them via electrodes which the photovoltaic cell includes. The potential difference (open-circuit voltage, $V_{oc}$ and the maximum current (short-circuit current $I_{sc}$) which may be provided by the photovoltaic cell depend both on the constitutive materials of the assembly of the cell and on the conditions surrounding this cell (including illumination through spectral intensity, temperature, . . . ). In the case of organic materials, the models are substantially different—making further reference to the notion of donor and acceptor materials in which electron-hole pairs called excitons are created. The final purpose remains the same: separate the charge carriers for collecting and generating a current.

Figure 1:
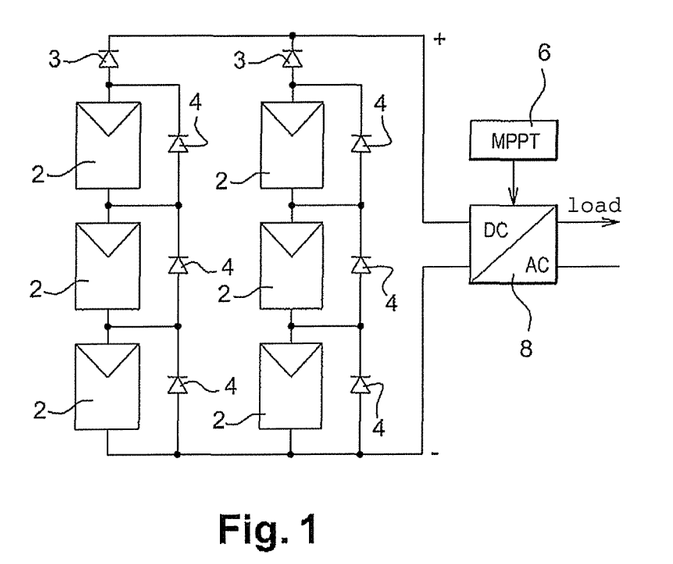
FIG. 1 schematically illustrates an example diagram of a prior art photovoltaic generator.

FIG. 1 schematically illustrates an exemplary photovoltaic generator. Most photovoltaic generators consist of at least one panel of photovoltaic cells connected in series and/or in parallel. It is possible to connect several groups of cells in series in order to increase the total voltage of the group of cells; it is also possible to connect several groups of cells in parallel in order to increase the global amperage of the generator. In the same way, several panels may be connected in series and/or in parallel in order to increase the voltage and/or the amperage of the generator depending on the application.

FIG. 1 illustrates a photovoltaic generator comprising two parallel branches each comprising three groups 2 of cells. In order to guarantee the electric safety of the photovoltaic generator, anti-return diodes 3 and bypass diodes 4 are recommended. The anti-return diodes 3 are connected in series on each parallel branch of the generator in order to avoid the flow in the cells of a negative current arriving from the application or from other branches of the generator. The bypass diodes 4 are connected in anti-parallel on groups 2 of cells. With the bypass diodes 4, a group 2 of cells having a fault or a shadowing problem may be short-circuited and the problem of hot spots can thereby be solved.

Figure 2:
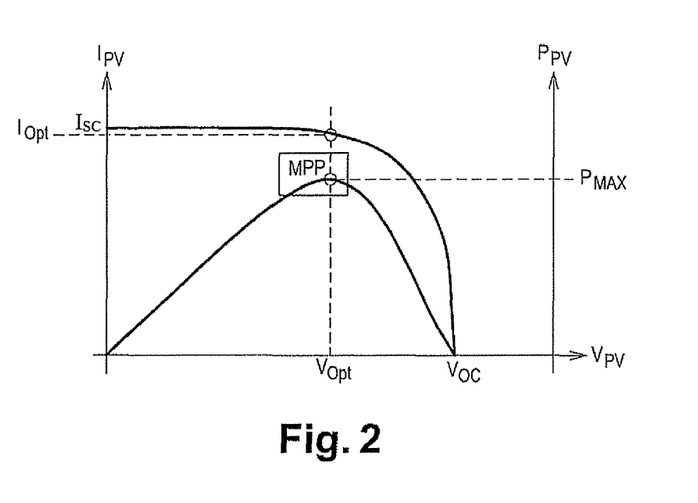
FIG. 2 illustrates a current-voltage and power characteristics of a photovoltaic cell.

The maximum voltage of the generator corresponds to the sum of the maximum voltages of the cells which make it up and the maximum current which the generator may deliver corresponds to the sum of the maximum currents of the cells. The maximum voltage $V_{oc}$ of a cell is reached for an unconnected cell, i.e. for zero output current (open circuit) and the maximum current $I_{sc}$ of a cell is attained when its terminals are short-circuited, i.e. for zero voltage on the terminals of the cell. The maximum values $V_{oc}$ and $I_{sc}$ depend on the technology and on the material used for making the photovoltaic cell. The maximum value of the current $I_{sc}$ also strongly depends on the sunlight level of the cell. A photovoltaic cell thus has a non-linear current/voltage characteristic and a power characteristic with a maximum power point (MPP) which corresponds to optimum values of voltage $V_{op}$ and current $I_{op}$. FIG. 2 illustrates the current-voltage $I_{pv}$ and power $P_{pv}$ characteristics of a photovoltaic cell with its maximum power point (MPP). Also, a photovoltaic generator will have a non-linear current/voltage characteristic and a power characteristic with a maximum power point. If a portion of the cells is shaded or if one or more cells of a group are faulty, the maximum power point MPP of this group will be displaced.

It is known how to optimize the operation of a photovoltaic generator by using a control for tracking the maximum power point (or MPPT i.e. Maximum Power Point Tracker). Such an MPPT control may be associated with a static converter (SC) which, depending on the applications may be a DC/AC converter or a DC/DC converter. FIG. 1 thus shows a static DC/AC converter 8 connected at the output of the generator and collecting the electric energy produced by the whole of the cells of the generator in order to deliver it to a load. Depending on the needs of the load, the converter may be led to increasing or lowering the output voltage and/or to rippling the output voltage. FIG. 1 also shows an MPPT control 6 associated with the converter 8.

The MPPT control 6 is designed in order to control the converter 8 in order to obtain an input voltage which corresponds to an optimum voltage value $V_{opt}$ i.e. corresponding to a maximum point of the power characteristic. The maximum power point depends on several variable parameters over time, notably on the sunlight present, on the temperature of the cells or on the number of cells in an operating state.

In this way, the yield of the photovoltaic generator is not affected too much by the malfunction or the shade of certain cells. The electric yield of the generator directly depends on the state of each photovoltaic cell.

For example, the maximum power point tracker MPPT control may apply an algorithm which identifies the influence of a voltage change on the power delivered by the generator and causes a shift in the voltage in the direction identified as increasing the power. Thus, such an algorithm consists of measuring the power delivered by the generator for a first voltage and, after a certain time, of imposing a second voltage greater than the first and then measuring or estimating the corresponding power. In the case when the power corresponding to the second voltage is greater than the power corresponding to the first voltage, the following step of the algorithm is to impose an even greater third voltage. In the opposite case, the third applied voltage is lower than the first voltage. Thus, gradually the system may permanently adapt the voltage to the terminals of the photovoltaic generator in order to approach the maximum power point as closely as possible. It is understood that other algorithms may be applied for the MPPT control.

However there exists a need for optimizing the management of the energy produced by each group of photovoltaic cells of a generator, notably for adapting at best the power of the generator to the needs of the load, and/or for efficiently and rapidly compensating for the faults and/or sunlight variations affecting certain cells.

For this purpose, the invention proposes an electronic management system for a photovoltaic generator comprising a plurality of microconverters each associated with one or more cells and at least one reconfiguration module adapted for managing the energy flows from each microconverter. The reconfiguration module may thus, depending on the needs of the load and/or depending on the state of the different groups of cells, modify the transfer of energy flows. The reconfiguration of the transfer of the energy flows is controlled by a central unit. It is thus possible to optimize the generator's production of electric energy by adapting the provided power according to the required needs and/or according to the operating condition of the different cells.

The invention more specifically relates to an electronic management system for a photovoltaic generator, the system comprising:
- a plurality of static microconverters, each microconverter being electrically connected to at least one photovoltaic cell,
- at least one reconfiguration module adapted for transmitting energy flows from at least one microconverter towards a load,
- a central electronic unit adapted for controlling a modification of the energy flows transmitted by said at least one reconfiguration module.

According to an embodiment, each microconverter is associated with management electronics adapted for communicating with the central electronic unit. The management electronics may measure electric data at the input and/or at the output of the microconverter. The management electronics may comprise a control for tracking the maximum power operating point (MPPT). The management electronics may comprise a clock and/or a temperature sensor.

According to an embodiment, a microconverter is connected to each cell of a multi junction photovoltaic device.

According to the embodiments, the central electronic unit is adapted for communication with the load and/or with an outer network.

According to an embodiment, the reconfiguration module comprises a plurality of switches. According to the embodiments, the central electronic unit is adapted so as to control a putting in series or in parallel of at least two microconverters through a reconfiguration module. The central electronic unit is also adapted for controlling short-circuiting or bypassing of at least one microconverter through a reconfiguration module.

The invention also relates to a photovoltaic generator comprising at least one photovoltaic cell and a management system according to the invention.

Figure 3:
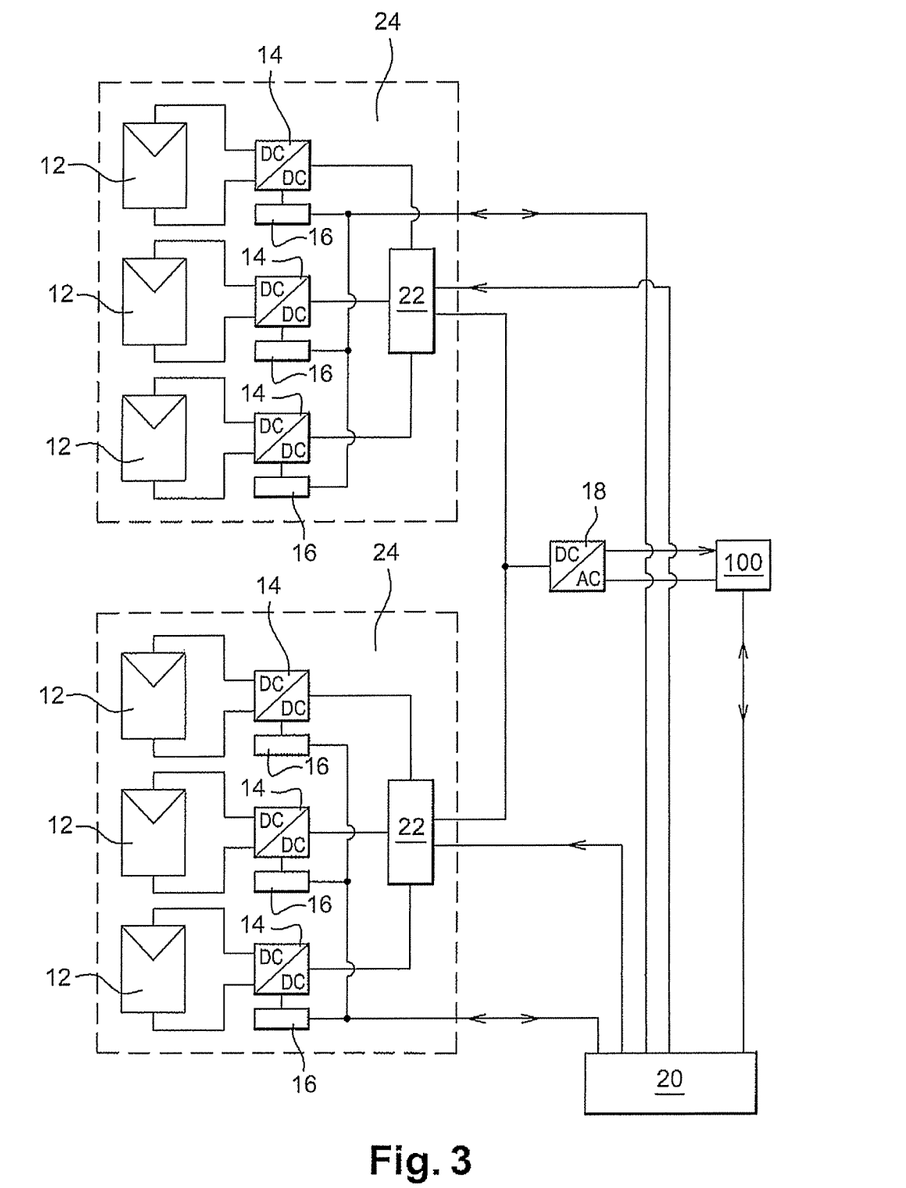
FIG. 3 an example electronic management system according to the invention.
Figure 4:
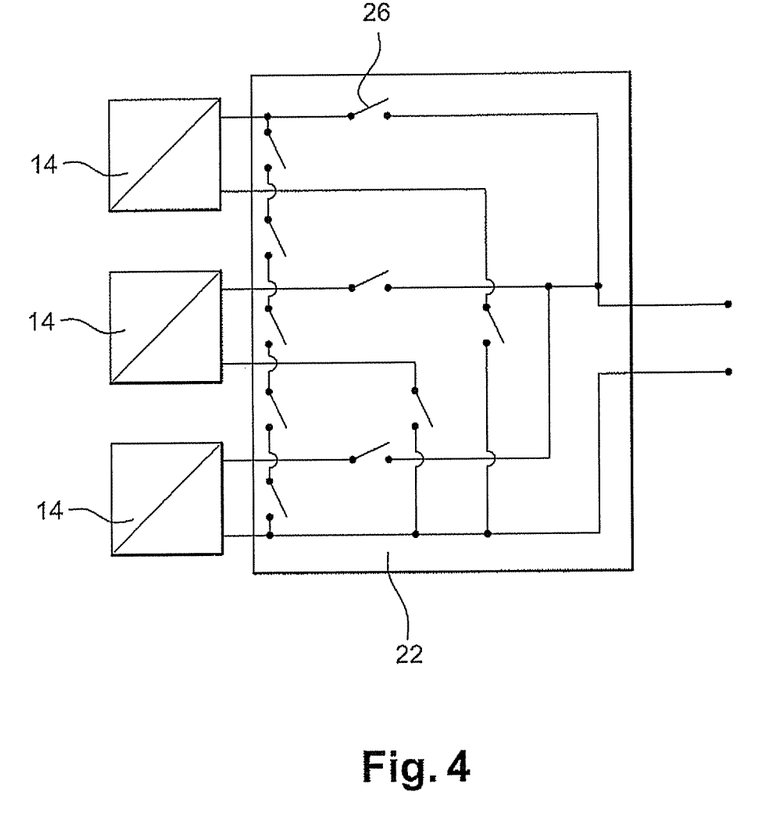
FIG. 4 illustrates a diagram of an example reconfiguration module of the system according to the invention.

Other features and advantages of the invention will become apparent upon reading the description which follows of the embodiments of the invention, given as an example and with reference to the appended drawings, which show:

FIG. 1, already described, a diagram of photovoltaic generator of the state of the art;

FIG. 2, already described, theoretical current-voltage and power characteristics of a photovoltaic cell;

FIG. 3, a diagram of an exemplary electronic management system according to the invention, and FIG. 4, a diagram of a reconfiguration module of the system according to the invention.

The invention proposes an electronic management system of a photovoltaic generator comprising a plurality of photovoltaic cells connected in series and/or in parallel. The electronic system according to the invention comprises a plurality of static microconverters. By <<microconverter>> is meant a converter associated with a photovoltaic cell or associated with a small group of photovoltaic cells as opposed to a single output converter associated with the whole of the cells of the generator. Each microconverter is electrically connected to at least one photovoltaic cell in order to collect the energy produced by the cell and to transfer it towards a load. The electric application for which the photovoltaic generator is intended is called a <<load>>.

The management system of the invention also includes a central electronic unit which controls at least one reconfiguration module. Such a reconfiguration module is adapted for transmitting output powers of several microconverters towards the load. The central electronic unit controls each reconfiguration module in order to control the distribution of the energy flows from each converter depending on the needs of the load and/or on the state of the cells of the generator. Management of the energy produced by each photovoltaic cell may therefore be optimized in spite of the faults of cells and/or premature aging of certain cells and/or the occurrence of hot points.

FIG. 3 illustrates an exemplary electronic management system of a photovoltaic generator according to the invention. This system makes it possible to optimize the electric energy production of photovoltaic cells.

The management system according to the invention comprises a plurality of static (DC/DC or DC/AC) microconverters 14 each connected to at least one photovoltaic cell. In the example of FIG. 3, six microconverters 14 are illustrated and are connected to six groups of photovoltaic cells 12. Such a schematic configuration is only given as an illustration, it being understood that the system may manage tens or hundreds of microconverters 14, each microconverter being able to be associated with one or several hundreds of cells 12.

Each microconverter 14 may be associated with electronics 16 for managing the energy of the cell(s) 12 associated with the microconverter 14. Such electronics 16 may notably include a control for tracking the maximum power point MPPT of the associated photovoltaic cell(s) 12. The MPPT control is adapted for applying an algorithm for seeking the maximum power point of the photovoltaic cell(s) 12 such as the algorithm described earlier for example. The management electronics 16 may comprise voltage, current and temperature sensors. It may thus measure electric data (current and/or voltage) at the input and/or at the output of the microconverter 14 with which it is associated. It may also measure the temperature of the panel. The management electronics 16 is in communication with a central electronic unit 20 and is adapted for controlling a modification of the operation of the microconverter 14 with which it is associated. The management electronics 16 may send its measurement directly to the central unit 20 or process them directly so as to only report the malfunction cases to the central unit. For this purpose, the management electronics 16 may comprise a microcontroller or an integrated logic circuit (FPGA) integrating real-time computing algorithms. If the management electronics 16 integrates an MPPT control, it includes a real-time computer which may be adapted for applying the invention.

In FIG. 3, the plurality of microconverters 14 is also connected into an output static converter 18 of the generator for matching the load 100. In FIG. 3, a single output converter 18 is illustrated, but it is understood that several converters 18 may be placed in series, in parallel or in cascade depending on the size and on the architecture of the photovoltaic generator. In the example of FIG. 3, the output converter 18 is a DC/AC converter but this may be a DC/DC converter; the converter 18 may be a voltage step-up or step-down converter depending on the contemplated applications. For example, the converter 18 gives the possibility of having at the output of the system an electric power either combined or not with a signal of the line carrier current (LCC) type which may be used in the electric network.

The connection of each microconverter 14 to the output converter 18 is achieved via reconfiguration modules 22 which are power switching units. In FIG. 3, a reconfiguration module 22 is associated with three microconverters 14, but this example is purely illustrative and non-limiting.

The reconfiguration modules 22 allow management of the energy flows from each microconverter 14 towards the output converter 18 and allow reconfiguration of the energy flows depending on possible faults of certain groups of cells 12 and/or depending on specific energy needs of the load 100. The reconfiguration module is controlled by a central electronic unit 20.

The central unit 20 may for example be a microcontroller. The central unit 20 receives information from each management electronics entity 16 and may control each reconfiguration module 22 as well as each management electronics entity 16. The central unit 20 may also receive information from the load 100—such as for example a specific energy need request—and it may also transmit information to the load 100—such as for example to inform it on an emergency power cut. The central unit 20 may also communicate with an outer network—such as for example an electric operator in order to inform him/her on a fault or on the necessity of maintenance.

The communications between the central unit 20 and the upper element described above may be ensured by any suitable means, such as network cables, line carrier currents (LCC), wireless communication protocols (WiFi) or other means. The communication between the central unit 20 and the management electronics 16 is bidirectional, as well as the communication between the central unit 20 and the load 100 and the central unit 20 and the outer network. On the other hand, the communication between the central unit 20 and the reconfiguration modules 22 is unidirectional, the modules 22 receiving controls from the central unit 20 without having to communicate information themselves. Each of these communications may use a different technology and a different protocol.

From the information received by each management electronics entity 16 and/or by the load 100, the central unit 20 may control each reconfiguration module 22 in order to modify the energy flows transmitted by each microconverter 14 by taking into account the needs and/or the operating condition of the whole of the cells and of the microconverters of the generator. The central unit 20 may also control each electronics entity 16 in order to cause optimum modification of the management of each microconverter 14. Notably, in the case of malfunction or fault of certain groups of cells, the central unit 20 is aware of this by the management electronics 16 associated with each of these groups and may control a reconfiguration of the energy flows provided by each other group of cells.

FIG. 4 schematically illustrates details of a reconfiguration module 22. In FIG. 4, the reconfiguration module 22 is associated with three microconverters 14 but it is understood that this representation is not limiting. The reconfiguration module 22 has 2n power inputs, n being equal to the number of microconverters 14 associated with the module and 2 power outputs. The reconfiguration module 22 thus receives as input the electric powers provided by each microconverter 14 and provides at the output an increased power. The reconfiguration module 22 comprises a plurality of switches 26 which are controlled by the central electronic unit 20. The switches 26 may be of any suitable type depending on the electronics applied in the module 22 and according to the selected communication protocol with the central unit 20; for example transistors or programmable logic circuits (FPGA) may be used.

Depending on the needs of the load, the reconfiguration module 22 may provide a high voltage, by putting the microconverters 14 in series, or provide a large current, by putting the microconverters 14 in parallel. The putting into series or into parallel of the modules is controlled by the central electronic unit 20 which controls the closing and opening of the suitable switches 26. The needs of the load 100 are known to the central electronic unit 20, either by a request directly sent by the load or by an order from the network.

Several reconfiguration modules 22 may be arranged in series, as this is illustrated in FIG. 3 in order to allow configuration of the photovoltaic generator in a wide voltage range. Also, several reconfiguration modules 22 may be associated in parallel in order to allow configuration of the photovoltaic generator in a wide current range.

The electronic management system according to the invention thus allows management of the different needs of the load with which the photovoltaic generator is associated, even when these needs change over time. Moreover, the electronic management system according to the invention also allows management of temporary or definitive malfunction situations of the elements of the generator.

In the case of malfunction of a group of cells 12 and/or of a microconverter 14, the reconfiguration module 22 may short-circuit or temporarily or definitively bypass the relevant power inputs. The short-circuiting or the bypassing of a microconverter 14 is controlled by the central electronic unit 20 which controls the closing and opening of the suitable switches 26.

The causes of malfunction of a group of cells 12 may be multiple and notably include the aging of the cells 12, a lack of sunlight or a definitive fault. The multiplicity of the causes of malfunction makes detection of the operating condition of the group of cells 12 desirable and which is easy to carry out. A malfunction of a group of photovoltaic cells 12 may be detected by a modification of the current-voltage characteristic at the input of the microconverter 14 for example. The management electronics 16 measures these electric data at the input of the microconverter 14. The measurement may be conducted continuously or at regular intervals.

A malfunction of a microconverter 14 may be detected by modification of its current-voltage characteristic. The management electronics 16 measures these electric data at the output of the microconverter 14. The measurement may be made continuously or at regular intervals.

The management system according to the invention proposes to overcome these malfunction situations. As indicated above, the management electronics 16 measures the currents and voltages at the input and at the output of the microconverter 14.

If the product $I_{pv} \cdot V_{pv}$ the power at the input of the microconverter 14, is zero, this means that the associated cell(s) 12 are shaded or faulty. In order to discriminate between temporary shading, prolonged shading and a definitive fault, the management electronics 16 may include a clock. If the product $I_{pv} \cdot V_{pv}$ remains zero for a period of time less than a first threshold, the management electronics 16 draws the conclusion of a simple temporary shade and may directly manage this situation by ordering that its microconverter 14 place itself in a short-circuit temporarily. If the product $I_{pv} \cdot V_{pv}$ remains zero for a period of time greater than this first threshold but less than a second threshold, the management electronic 16 draws the conclusion of prolonged shading and warns the central unit. If the product $I_{pv} \cdot V_{pv}$ remains zero for a period of time longer than the second threshold, the management electronic 16 draws the conclusion of a definitive fault of the cell group and warns the central unit. Of course, the time threshold depends on the applications. It is also possible to decide to operate with a single time threshold or without any threshold.

In the case of shading, the central unit 20 may order the modules 22 to reconfigure energy flows by short-circuiting the shaded group and by reorganizing the flows provided by the microconverters 14 of the groups of non-shaded cells 12. For example, the central unit 20 may give instruction to certain management electronics entities 16 to modify the operation of a microconverter 14 associated with non-shaded cells. On command from the central unit 20, the management electronics 16 may even force a microconverter 14 into a degraded mode. Indeed, each microconverter may step up or step down the voltage provided by the cells which are associated with it (within the limits of the maximum voltage $V_{oc}$).

In the case of a definitive failure of a group of cells 12, the management electronics 16 informs the central unit 20 about this and may order that the microconverter 14 place itself in a bypass mode. Indeed, each microconverter 14 may replace the bypass diodes as well as the anti-return diodes. Of course, the microconverters 14 do not exclude the presence of conventional protection diodes as described with reference to FIG. 2. The central unit 20, informed on this definitive failure, may inform the operator about this.

If the product $I_s \cdot V_s$, i.e. the outer power of the microconverter 14 is zero or infinite, this means that the microconverter 14 is faulty. The management electronics 16 informs the central unit 20 about this, which orders the reconfiguration module 22 to short-circuit the power inputs corresponding to the faulty microconverter. The central unit 20 may also order a reorganization of the energy flows provided by the other non-faulty microconverters. The central unit 20 may also inform the operator on this fault.

The electronic management system according to the invention may also include safety functions. For example, the central unit 20 may order stopping of the whole of the microconverters 14 as well as of the converter 18. The central unit 20 may control such a emergency stopping on an order from the load 100 or from the outer network or by itself based on information received from the management electronics 16, such as for example an excessive temperature of several groups of cells 12. Each management electronics entity 16 may also include local safety functions, notably in the case of overheating of a group of cells 12; it may then place its microconverter 14 in a short-circuit and inform the central unit 20 about this.

The electronic management system according to the invention may also include an anti-theft function. For example the central unit 20 may order the opening of the whole of the switches 26 of the reconfiguration module 22 if it is informed on a displacement of the generator—by a mechanical switch for example. A code or an order from the operator may then be required for reactivating the switches 26 of the reconfiguration modules 22 and again allow transfer of energy from the photovoltaic cells to a load 100.

The central unit 20 of the management system may further transmit information relating to the operating condition of the groups of cells 12 and/or of the microconverters 14 of each panel 24 to a central system of an electricity network. With this, the maintenance of the panels 24 may be facilitated. In particular, the operator in charge of the maintenance is then warned more rapidly of a malfunction of certain groups of photovoltaic cells 12 or of certain microconverters 14 and may take steps accordingly.

The management system according to the invention may be entirely or partly integrated into a photovoltaic generator. The generator may comprise several panels 24; each panel 24 may comprise several groups of photovoltaic cells connected in series and/or in parallel. In the diagram of FIG. 3, two panels 24 are illustrated each comprising three groups of cells 12 but it is understood that this representation is not numerically limiting.

According to a possible embodiment, multi junction photovoltaic devices may be used. It then becomes necessary to manage the problem of electric coupling of the different junctions. A multi junction photovoltaic device, for example with a tandem junction, designates a photovoltaic device consisting of several simple junctions stacked in order to increase the area for solar spectrum absorption by the device. The photovoltaic devices with a tandem junction give the possibility of obtaining a better electrical conversion yield. The main drawback of electric coupling in a photovoltaic device with a tandem junction is the requirement of harmony in the performances of the photovoltaic cells making up the tandem, regardless of the sunshine conditions. This ideal case is not accessible in reality since the current production of each cell of the tandem is voluntarily different according to the region of the spectrum where they are active and varies depending on the sunshine conditions. The result of this is an intrinsic limitation of the photovoltaic device with a tandem junction by the weakest of its elements. Such a current limitation strongly reduces the theoretical yield of a photovoltaic device with a tandem junction. A solution consists of electrically decoupling the junctions of a photovoltaic device with a tandem junction. The photovoltaic cells of the tandem are always optically coupled but are electrically decoupled. Each junction is then associated with two electric electrodes; a photovoltaic device with four electrodes (in the case of a tandem) is thereby obtained. By connecting a microconverter 14 to each photovoltaic cells of the tandem, with the system, it is possible to obtain a multi junction photovoltaic device operating with photovoltaic cells electrically decoupled and each managed optimally via the reconfiguration modules 22.

The invention has just been described with reference to examples illustrated in the appended figures. However, it is understood that this description is not limiting. Notably, the number and the arrangement of the groups of cells 12, of the microconverters 14 and of the reconfiguration modules 22 depend on the contemplated applications and on the architecture of the photovoltaic generator. The algorithms used in the MPPT controls which may be included in the management electronics 16 may be any existing algorithm or which would be developed subsequently and each electronics entity 16 may not have the same applied algorithm. Also, the communications protocols used between the central unit 20 and the elements of the system or an outer network may be adapted according to the available technologies.

What is claimed is:

1. An electronic management system for a photovoltaic generator, the system comprising:
    a plurality of static DC/DC microconverters, each DC/DC microconverter being electrically connected to photovoltaic cell, the photovoltaic cell forming a portion of the whole of the cells of the generator;
    at least one reconfiguration module adapted for transmitting energy flows from said DC/DC microconverters towards a load via an output static converter;
    a plurality of management electronics entities, wherein each of the plurality of DC/DC microconverters is associated with at least one of the plurality of the management electronics entities, the at least one of the management electronics entities for measuring electronic data from the at least one DC/DC microconverter; and
    a central electronic unit communicating with the load and the plurality of management electronic entities, controlling a modification of the energy flows transmitted by said at least one reconfiguration module based at least on the measured electronic data, the central electronic unit adapted for a putting into series of at least two DC/DC microconverters, a putting into parallel of at least two DC/DC microconverters, or a bypassing of at least one microconverter based at least on information received from the plurality of management electronics entities and from the load.

2. The system according to claim 1, wherein the management electronics measures electric data at the input and/or at the output of the DC/DC microconverter.

3. The system according to claim 1, wherein the management electronics comprises a control for tracking the maximum power operating point (MPPT).

4. The system according to claim 1, wherein the management electronics comprises a clock.

5. The system according to claim 1, wherein the management electronics comprises a temperature sensor.

6. The system according to claim 1, wherein a microconverter is connected to each cell of a multi junction photovoltaic device.

7. The system according to claim 1, wherein the central electronic unit is adapted for communicating with an outer network.

8. The system according to claim 1, wherein the central electronic unit is adapted for controlling a short-circuiting of at least one DC/DC microconverter through the at least one reconfiguration module.

9. The system according to claim 1, wherein the at least one reconfiguration module comprises a plurality of switches.

10. A photovoltaic generator comprising:
    at least one photovoltaic cell; and
    an electronic management system comprising:
        a plurality of static DC/DC microconverters, each DC/DC microconverter being electrically connected to the at least one photovoltaic cell, the at least one photovoltaic cell forming a portion of a whole of the cells of the generator;
        a reconfiguration module adapted for transmitting energy flows from said DC/DC microconverters towards a load via an output static converter;
        a plurality of management electronics entities, wherein each of the plurality of DC/DC microconverters is associated with at least one of the plurality of the management electronics entities, the at least one of the management electronics entities for measuring electronic data from the at least one DC/DC microconverter; and
        a central electronic unit communicating with the load and the plurality of management electronic entities, controlling a modification of the energy flows transmitted by said at least one reconfiguration module based at least on the measured electronic data, the central electronic unit adapted for a putting into series of at least two DC/DC microconverters, a putting into parallel at least two DC/DC microconverters, or a bypassing of at least one microconverter based at least on information received from the management electronics entities and from the load.

11. An electronic management system for a photovoltaic generator comprising at least one multi-junction photovoltaic device, the system comprising:
    a plurality of static DC/DC microconverters, one DC/DC microconverter being electrically connected to each cell of the at least one multi-junction photovoltaic device;
    at least one reconfiguration module adapted for transmitting energy flows from said microconverters towards a load via an output static converter;
    a plurality of management electronics entities, wherein each of the plurality of DC/DC microconverters is associated with at least one of the plurality of the management electronics entities, the at least one of the management electronics entities for measuring electronic data from the at least one DC/DC microconverter; and
    a central electronic unit communicating with the load and the plurality of management electronic entities, controlling a modification of the energy flows transmitted by said at least one reconfiguration module based at least on the measured electronic data, the central electronic unit adapted for a putting into series of at least two DC/DC microconverters, a putting into parallel at least two DC/DC microconverters, or a bypassing of at least one microconverter based at least on information received from the management electronics entities and from the load.

12. A photovoltaic generator comprising:
    at least one multi-junction photovoltaic device; and
    an electronic management system comprising:
    a plurality of static DC/DC microconverters, one DC/DC microconverter being electrically connected to each cell of the at least one multi-junction photovoltaic device,
    a reconfiguration module adapted for transmitting energy flows from said DC/DC microconverters towards a load via an output static converter;
    a plurality of management electronics entities, wherein each of the plurality of DC/DC microconverters is associated with at least one of the plurality of the management electronics entities, the at least one of the management electronics entities for measuring electronic data from the at least one DC/DC microconverter; and
    a central electronic unit communicating with the load and the plurality of management electronic entities, controlling a modification of the energy flows transmitted by said at least one reconfiguration module based at least on the measured electronic data, the central electronic unit adapted for a putting into series of at least two DC/DC microconverters, a putting into parallel at least two DC/DC microconverters, or a bypassing of at least one microconverter based at least on information received from the management electronics entities and from the load.

13. The electronic management system of claim 11, wherein each DC/DC microconverter is associated with management electronics adapted for communicating with the central electronic unit, the management electronics including a maximum power point tracker (MPPT).

14. The photovoltaic generator of claim 12, one or more of the plurality of static DC/DC microconverters are adapted for communicating with the central electronic unit.

* * * * *